United States Patent
Chou et al.

(10) Patent No.: US 9,334,419 B2
(45) Date of Patent: May 10, 2016

(54) UV-CURABLE COATINGS

(71) Applicant: CORNING INCORPORATED, Corning, NY (US)

(72) Inventors: Hsin-Chieh Joe Chou, San Mateo, CA (US); Arthur Winston Martin, Horseheads, NY (US); Prakash Chandra Panda, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 14/748,662

(22) Filed: Jun. 24, 2015

(65) Prior Publication Data

US 2015/0376443 A1 Dec. 31, 2015

Related U.S. Application Data

(60) Provisional application No. 62/018,159, filed on Jun. 27, 2014.

(51) Int. Cl.

| | |
|---|---|
| *C08F 2/46* | (2006.01) |
| *C08F 2/50* | (2006.01) |
| *C08G 61/04* | (2006.01) |
| *C09D 163/00* | (2006.01) |
| *C08K 5/1515* | (2006.01) |
| *B05D 3/06* | (2006.01) |
| *C03C 17/30* | (2006.01) |
| *C03C 17/32* | (2006.01) |

(52) U.S. Cl.
CPC ............ *C09D 163/00* (2013.01); *B05D 3/067* (2013.01); *C03C 17/30* (2013.01); *C03C 17/326* (2013.01); *C08K 5/1515* (2013.01)

(58) Field of Classification Search
CPC ...... C09D 163/00; B05D 3/067; C03C 17/30; C03C 17/326; C08K 5/1515
USPC ............... 522/75, 74, 71, 1, 189, 184; 520/1
See application file for complete search history.

(56) References Cited

U.S. PATENT DOCUMENTS

| | | | |
|---|---|---|---|
| 6,245,872 B1 | 6/2001 | Frey et al. | |
| 6,899,948 B2 | 5/2005 | Zhang et al. | |
| 2010/0327493 A1* | 12/2010 | Fong ................... | C07C 381/12 264/401 |
| 2012/0088106 A1* | 4/2012 | Jing ...................... | B82Y 30/00 428/426 |

FOREIGN PATENT DOCUMENTS

| | | | |
|---|---|---|---|
| CN | 101974227 A | | 2/2011 |
| JP | 2009-270027 | * | 11/2009 |
| WO | 2005119771 A1 | | 12/2005 |
| WO | 2012154316 A1 | | 11/2012 |
| WO | 2014099699 A1 | | 6/2014 |

OTHER PUBLICATIONS

Kobayashi, JP 2009-270027 Machine translation, Nov. 19, 2009.*
Eshel et al, Nanotailoring or nanocomposite hydrogels containing POSS, May 24, 2008, Polymer Bulletin, 257-265.*
Zheng et al. "Effects of nanoparticles SiO2 on the Performance of Nanocomposites." Materials Letters 57 (2003) p. 2940-2944.
XP002744294, Database WPI, Feb. 16, 2011, Thomas Scientific, London, GB; AN 2011-D91249.
Patent Cooperation Treaty International Notification of Transmittal of the International Search Report and The Written Opinion of the International Searching Authority, international application No. PCT/US2015/037317: mailing date Oct. 2, 2015, 12 pages.

* cited by examiner

*Primary Examiner* — Ling Choi
*Assistant Examiner* — Jessica E Whiteley
(74) *Attorney, Agent, or Firm* — John T. Haran (57) ABSTRACT

UV-curable coating compositions are provided including (in weight %) 5-50% cycloaliphatic crosslinker of the formula

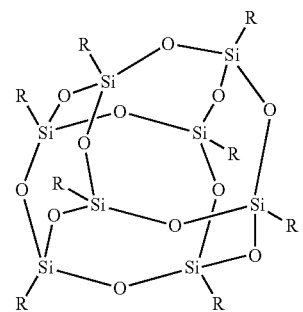

wherein R is

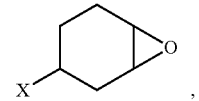

wherein X is a $C_{1-4}$ straight chain, 20-55% of a summed amount of an oxetane crosslinker and an epoxy diluent, 35-45% epoxy functionalized silicon nanoparticles, 1-5% epoxy silane adhesion promoter and 0.5-2% photoinitiator.

27 Claims, 5 Drawing Sheets

UV-CURABLE COATINGS

CROSS-REFERENCE TO RELATED APPLICATIONS

This application claims the benefit of priority under 35 U.S.C. §119 of U.S. Provisional Application Ser. No. 62/018,159 filed on Jun. 27, 2014 the content of which is relied upon and incorporated herein by reference in its entirety.

BACKGROUND

The present disclosure relates to ultraviolet (UV)-curable coatings. The disclosure also relates to articles including such coatings, and methods for modifying substrates using such coatings.

SUMMARY

Glass is extremely strong in its pristine, freshly drawn state. However, the strength of a glass is typically compromised if its surface becomes flawed, such as through scratching, abrasion, impact, or the like. One way to prevent flaws from occurring is to apply one or more coatings to the glass edge and/or surface. UV-curable coatings offer certain advantages over other coatings, including, inter alia, fast curing, no solvent, and relatively low energy requirements.

However, known UV-curable coatings lack certain desirable properties, especially in connection with display glass applications such as television, computer and cell phone display screens. Glasses for such products must pass usage and environmental durability tests used by the cell phone industry. Currently-available UV-curable coatings for glass lack adequate static indentation fracture resistance, resistance to breakage as measured by abraded 4-point bend testing, and resistance to scratching and abrasion to make the coatings suitable for use in display glass applications. Moreover, coatings for display applications should be optically clear, or at least substantially transmissive to light wavelengths of interest (i.e., infrared, visible, UV) and have good water resistance. It is also desirable that coatings for glasses in display applications be essentially invisible/non-apparent, so that the coated glass appears as if it includes no coating at all. It is further desirable that such coatings have stable viscosity at room temperature and have long shelf life to increase the manufacturing rate of cut strengthened glass product which may be used in low-cost, high performance touch panel devices, increase material utilization rate during coating, and reduce storage and shipping cost compared to unstable material. No UV-curable coatings satisfying all of the foregoing criteria are currently available.

In accordance with one embodiment, UV-curable epoxy-functionalized nanosilicate coatings including a silane coupling agent as an adhesion promoter are provided which meet all of the above criteria. Selected silane coupling agents may be employed as an additive to novel epoxy formulation disclosed herein or as a glass primer coating employed prior to application of the novel epoxy formulations to increase adhesion between the epoxy resin and glass to enhance glass surface and edge protection. A significant challenge to achieving usable epoxy formulations employing nanosilicate has been obtaining viscosity stability at room temperature. Surprisingly, compositions with room temperature-stable viscosity were achieved employing a mixture of an oxetane crosslinker and epoxy diluent.

In accordance with one or more embodiments, UV-curable coating compositions are provided including (in weight %) 5-50% cycloaliphatic crosslinker of the formula wherein R is wherein X is a $C_{1-4}$ straight chain, 20-55% of a summed amount of an oxetane crosslinker and an epoxy diluent, 35-45% epoxy functionalized silicon nanoparticles, 1-5% epoxy silane adhesion promoter and 0.5-2% photoinitiator.

In one embodiment, the UV-curable coating composition may include 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator. In another embodiment a UV-curable coating composition consists of 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator.

In yet a further embodiment a UV-curable coating composition may include 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

In still a further embodiment the UV-curable coating composition consists of 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

The cycloaliphatic crosslinker may be a epoxycyclohexyl polyhedral oligomeric silsesquioxane.

The oxetane crosslinker may be any suitable oxetane crosslinker such as bis(1-ethyl-(3-oxetanyl)methyl)ether.

The epoxy diluent may be any suitable epoxy diluent such as 3-ethyl-3-hydroxymethyl oxetane.

Epoxy functionalized silicon nanoparticles may be any suitable epoxy functionalized silicon nanoparticles in the range of about 5-200 nm.

The silane adhesion promoter may be an amino functional silane, a ureido functional silane, an epoxy functional silane, a sulfur functional silane, and mixtures thereof.

In accordance with one embodiment a UV-curable coating composition is provided in which the silane adhesion promoter is 2-(3,4-epoxycyclohexyl)ethyltriethoxysilane, 2-(3,4-epoxycyclohexyl)ethyl-trimethoxysilane or a mixture thereof.

Suitable photoinitiators include photo-acid catalysts such as UVI 6976 cationic photoinitiator. In one embodiment the photoinitiator includes triarylsulfonium hexafluoroantimonate.

In accordance with at least some embodiments, the viscosity of UV-curable coatings disclosed herein is stable in the range of −20° C. to 40° C.

In yet a further embodiment, a process is disclosed for modifying the surface of a substrate, such as a glass substrate or a substrate that includes a glass surface, the process including the steps of applying to a surface of the substrate a UV-curable coating including (in weight %) 5-50% cycloaliphatic crosslinker of the formula wherein R is wherein X is a $C_{1-4}$ straight chain, 20-55% of a summed amount of an oxetane crosslinker and an epoxy diluent, 35-45% epoxy functionalized silicon nanoparticles, 0-5% epoxy silane adhesion promoter and 0.5-2% photoinitiator, and curing the surface using ultraviolet radiation. The curing step may include thermal curing. The process may include applying an epoxy silane adhesion promoter to the surface of the substrate when the UV-curable coating contains 0% epoxy silane adhesion promoter.

In at least one embodiment, the UV-curable coating may be operable to provide a modified surface having an indentation threshold fracture load of at least 30 Kgf.

Processes disclosed herein may include applying UV-curable coatings as described to a non-strengthened glass surface, i.e., a glass surface of a substrate that has not been subjected to strengthening as described hereinbelow. In other embodiments, a substrate which includes a non-strengthened glass surface and a strengthened glass surface may be subjected to a process which may include applying a UV-curable coating to at least the non-strengthened glass surface to increase the indentation threshold fracture load of the non-strengthened glass surface to at least 30 Kgf.

In accordance with one embodiment, articles including glass coated according to the present disclosure having improved static indentation fracture resistance, resistance to breakage as measured by abraded 4-point bend testing, resistance to scratching and abrasion, and moisture protection are provided. Moisture can get into small flaws and cause them to grow bigger over time. An effect call aging Articles with the foregoing characteristics may be formed by coating surfaces and/or edges of post-formed glass articles. Methods disclosed herein are compatible with low-cost, large-scale manufacturing of glass sheets, which may be used in low-cost, high-performance touch panel devices.

Glass articles in accordance with the present disclosure may be planar, such as sheets, or three-dimensional bodies, such as a bottle, vial, etc. Glass sheets can be monoliths or may be employed as one or more layers of a multi-layer glass laminate. The glass sheets may also have 3D formats.

In one embodiment the glass article may include an oxide glass, such as Gorilla® Glass, which is available from Corning Incorporated. Gorilla® Glass has been widely used in consumer electronics products. Such glass is used in applications where the strength of conventional glass is insufficient to achieve desired performance levels. Gorilla® Glass is manufactured by chemical strengthening (ion exchange) in order to achieve high levels of strength while maintaining desirable optical characteristics (such as high transmission, low reflectivity, and suitable refractive index). Strengthened glass through ion exchange (IX) techniques can produce high levels of compressive stress in the treated glass, as high as about 400 to 1000 MPa at the surface. One or more layers of a coating composition disclosed herein may be applied to a substrate such as Gorilla® Glass to provide a device having enhanced water, impact and scratch resistance properties.

In some embodiments articles are provided wherein the surface including the coating has an indentation threshold fracture load of at least 30 Kgf. In accordance with other embodiments, articles are provided having a substrate which includes a non-strengthened glass surface and a strengthened glass surface and the UV-curable coating is disposed on at least the non-strengthened glass surface.

Other aspects, features, and advantages will be apparent to one skilled in the art from the description herein taken in conjunction with the accompanying drawings.

DESCRIPTION OF THE DRAWINGS

For the purposes of illustration, one or more embodiments are shown in the drawings, it being understood, however, that the embodiments disclosed and described herein are not limited to the precise arrangements and instrumentalities shown.

DETAILED DESCRIPTION

The following is a detailed description to aid those skilled in the art in practicing the subject matter disclosed. Those of ordinary skill in the art may make modifications and variations in the embodiments described herein without departing from the spirit or scope of the subject matter. Unless otherwise defined, all technical and scientific terms used herein have the same meaning as commonly understood by one of ordinary skill in the art to which the disclosed subject matter belongs. The terminology used in this description is for describing particular embodiments only and is not intended to be limiting.

Various embodiments disclosed herein are directed to UV-curable coating compositions. In order to provide a fuller understanding of how the discoveries herein were achieved, and therefore the broad scope of the contemplated embodiments, a discussion of certain experimentation and/or theory will be provided. It is noted, however, that the embodiments herein are not necessarily limited to any such experimentation and/or theory.

Coating Compositions and Examples

UV-curable coating compositions are provided including (in weight %) 5-50% cycloaliphatic crosslinker of the formula wherein R is wherein X is a $C_{1-4}$ straight chain, 20-55% of a summed amount of an oxetane crosslinker and an epoxy diluent, 35-45% epoxy functionalized silicon nanoparticles, 1-5% epoxy silane adhesion promoter and 0.5-2% photoinitiator.

In one embodiment, the UV-curable coating composition may include 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator. In another embodiment a UV-curable coating composition consists of 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator.

In yet a further embodiment a UV-curable coating composition may include 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

In still a further embodiment the UV-curable coating composition consists of 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

The cycloaliphatic crosslinker may be an epoxycyclohexyl polyhedral oligomeric silsesquioxane such as may be obtained from Hybrid Plastics of Hattiesburg, Miss.

The oxetane crosslinker may be any suitable oxetane crosslinker such as bis(1-ethyl-(3-oxetanyl)methyl)ether, commercially available from Synasia of Metuchen, N.J.

The epoxy diluent may be any suitable epoxy diluent such as 3-ethyl-3-hydroxymethyl oxetane commercially available from Syansia.

Epoxy functionalized silicon nanoparticles may be any suitable epoxy functionalized silicon nanoparticles such as those commercially available from Nissan Chemical of Houston, Tex., Nanopox® C460 silica nanocomposite commercially available from Evonik Industries AG of Essen, Germany, etc. The epoxy functionalized silicon nanoparticles may be in the range of about 5-200 nm.

The silane adhesion promoter may be an amino functional silane, a ureido functional silane, an epoxy functional silane, a sulfur functional silane, and mixtures thereof. Suitable silane adhesion promoters are commercially available for example from Gelest of Morrisville, Pa. or Momentive of Columbus, Ohio (Silquest).

Suitable amino functional silanes include 3-aminopropyltriethoxysilane, 3-aminopropyltrimethoxysilane, aminophenyltrimethoxysilane, 3-aminopropyltris(methoxyethoxyethoxy)silane, 3-(m-aminophenoxy)propyltrimethoxysilane, 3-aminopropylmethyldiethoxysilane, N-(2-aminoethyl)-3-aminopropyltrimethoxysilane N-[3-(trimethoxysilyl)propyl]ethlenediamine damosilane, N-(2-aminoethyl)-3-aminopropyltriethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-3-[(amino(polypropyleneoxy)]aminopropyltrimethoxysilane, (3-trimethoxysilylpropyl)diethylene triamine, (3-trimethoxysilylpropyl)diethylenetriaminesilane, N-phenylaminopropyltrimethoxysilane, N-phenylaminomethyltriethoxysilane, bis(trimethoxysilylpropyl)aminesilane, bis[(3-trimethoxysilyl)propyl]-ethylenediaminesilane, bis[3(triethoxysilyl)propyl]ureasilane and mixtures thereof.

Suitable ureido functional silanes include ureidopropyltriethoxysilane, ureidopropyltrimethoxysilane and mixtures thereof.

Suitable epoxy functional silanes include 2-(3,4-epoxycyclohexyl)ethyltriethoxysilane, 2-(3,4-epoxycyclohexyl)ethyl-trimethoxysilane, (3-glycidoxypropyl)trimethoxysilane 3-(2,3-epoxypropoxy)propyltrimethoxysilane, (3-glycidoxypropyl)triethoxysilane, 5,6-epoxyhexyltriethoxysilane and mixtures thereof.

Suitable sulfur functional silanes include 3-mercaptopropyltrimethoxysilane, 3-mercaptopropyltriethoxysilane, bis-N—N'-(triethoxysilylpropyl)aminocarbonylpolyethylene oxide, bis-(3-(triethoxysilylpropoxy)-2-hydroxypropoxy)-polyethylene oxide, N—N'-(bis(2-hydroxyethyl)-N,N' bis(3-trimethoxysilylpropyl)ethylene-diamine, and mixtures thereof.

In accordance with one embodiment a UV-curable coating composition is provided in which the silane adhesion promoter is 2-(3,4-epoxycyclohexyl)ethyltriethoxysilane, 2-(3,4-epoxycyclohexyl)ethyl-trimethoxysilane or a mixture thereof.

Cycloaliphatic epoxy silanes (such as 2-(3,4-epoxy cyclohexyl)-ethyl triethoxy silane) are desirable silanes for formulations disclosed herein because the ring epoxide can crosslink with the cycloaliphatic epoxies contained in the resin to allow more uniform dispersion of the silane group, resulting in more uniform adhesion to glass. Amine functional silanes and others can also be effective used by opening the epoxy ring resulting in accelerating the cationic cure and enhancing adhesion.

The silane adhesion promoter may be used as additive to the disclosed compositions or employed as a glass primer coating adhesion promoter.

Suitable photoinitiators include photo-acid catalysts such as UVI 6976 cationic photoinitiator available from Dow Chemical of Midland, Mich. In one embodiment the photoinitiator includes triarylsulfonium hexafluoroantimonate.

Examples

Now referring to Table 1, several examples were prepared having compositions falling within the above-recited ranges.

Compositions

TABLE 1

Compositions and viscosity stability at room temperature

| Code | Composition (in weight %) | Viscosity stability |
|---|---|---|
| SIEPX-A | 11% cycloaliphatic crosslinker (Hybrid Plastics POSS ®)<br>44% epoxy diluent (3-ethyl-3-hydroxymethyl oxetane) (Synasia S-101)<br>39.9% Epoxy functionalized silica nanoparticles (20 nm)(Nissan Chemical MEK-EC-2104)<br>3.1% epoxy silane adhesion promoter (Gelest SIE4670.0)<br>2% photoinitiator (Dow Chemical UVI 6976) | Very unstable |
| SIEPX-A-2 | 27.5% cycloaliphatic crosslinker (Hybrid Plastics POSS ®)<br>27.5% epoxy diluent (3-ethyl-3-hydroxymethyl oxetane) (Synasia S-101)<br>39.9% Epoxy functionalized silica nanoparticles (20 nm) (Nissan Chemical MEK-EC-2104)<br>3.1% epoxy silane adhesion promoter (Gelest SIE4670.0)<br>2% photoinitiator (Dow Chemical UVI 6976) | Very unstable |
| SIEPX-B | 11% cycloaliphatic crosslinker (Hybrid Plastics POSS ®)<br>44% oxetane corsslinker (bis(1-ethyl-(3-oxetanyl)methyl)ether) (Synasia S221)<br>39.9% Epoxy functionalized silica nanoparticles (20 nm) Nissan Chemical MEK-EC-2104)<br>3.1% epoxy silane adhesion promoter (Gelest SIE4670.0)<br>2% photoinitiator (Dow Chemical UVI 6976) | Very unstable |
| SIEPX-C | 5.5% cycloaliphatic crosslinker (Hybrid Plastics POSS ®)<br>49.5% epoxy diluent (3-ethyl-3-hydroxymethyl oxetane) (Synasia S-101)<br>39.9% Epoxy functionalized silica nanoparticles (20 nm) (Nissan Chemical MEK-EC-2104)<br>3.1% epoxy silane adhesion promoter (Gelest SIE4670.0)<br>2% photoinitiator (Dow Chemical UVI 6976) | Very unstable |
| SIEPX-D | 5.5% cycloaliphatic crosslinker (Hybrid Plastics POSS ®)<br>49.5% oxetane crosslinker (bis(1-ethyl-(3-oxetanyl)methyl)ether) (Synasia S221)<br>39.9% Epoxy functionalized silica nanoparticles (20 nm) (Nissan Chemical MEK-EC-2104)<br>3.1% epoxy silane adhesion promoter (Gelest SIE4670.0)<br>2% photoinitiator | Very unstable |
| SIEPX-D-2 | 5.5% cycloaliphatic crosslinker (Hybrid Plastics POSS ®)<br>24.75% oxetane crosslinker (bis(1-ethyl-(3-oxetanyl)methyl)ether) (Synasia s221)<br>24.75% epoxy diluent (3-ethyl-3-hydroxymethyl oxetane) (Synasia S-101)<br>39.9% Epoxy functionalized silica nanoparticles (20 nm) (Nissan Chemical MEK-EC-2104)<br>3.1% epoxy silane adhesion promoter (Gelest SIE4670.0)<br>2% photoinitiator (Dow Chemical UVI 6976) | Very unstable |
| SIEPX-E | 5.5% cycloaliphatic crosslinker (Hybrid Plastics POSS ®)<br>49.5% epoxy diluent (3-ethyl-3-hydroxymethyl oxetane) (Synasia S-101)<br>39.9% Epoxy functionalized silica nanoparticles (20 nm) (Nissan Chemical Nissan Chemical MEK-EC-2102)<br>3.1% epoxy silane adhesion promoter (Gelest SIE4670.0)<br>2% photoinitiator (Dow Chemical UVI 6976) | Medium unstable |
| SIEPX-F | 5.5% cycloaliphatic crosslinker (Hybrid Plastics POSS ®)<br>24.75% epoxy diluent (3-ethyl-3-hydroxymethyl oxetane) (Synasia S-101)<br>24.75% oxetane crosslinker (bis(1-ethyl-(3-oxethanyl)methyl)ether) (Synasia S221)<br>39.9% Epoxy functionalized silica nanoparticles (20 nm) (Nissan Chemical MEK-EC-2102)<br>3.1% epoxy silane adhesion promoter (Gelest SIE4670.0)<br>2% photoinitiator (Dow Chemical UVI 6976) | Stable |

Methodology and Experiments

The samples in Table 1 were subjected to a variety of tests to evaluate performance under various conditions.

For purposes of the experiments, reference to SIEPX-F refers to a formulation identical to that listed in Table 1 for SIEPX-F, unless modified as indicated. For example, in some instances the SIEPX-F in the experiments is referred to as containing 0% epoxy silane adhesion promoter. In such instances, the SIEPX-F referred to is the same in all respects to the SIEPX-F formulation in Table 1, except that it contains 0% epoxy silane adhesion promoter.

Room Temperature Viscosity Stability.

Figure 1:
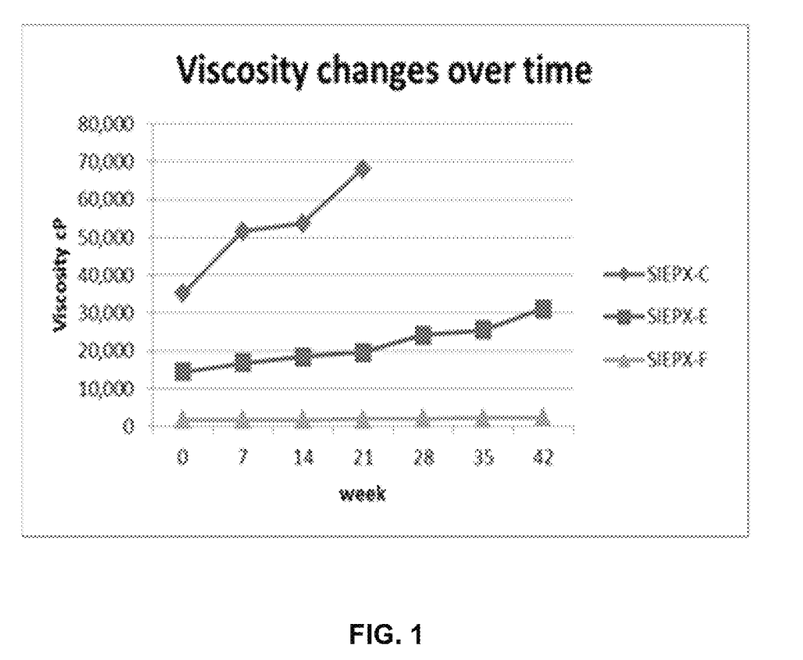
FIG. 1 is a graphical representation of viscosity changes over time for selected compositions in accordance with embodiments of the disclosed subject matter.

One of the major obstacles in formulating nanosilicate filled epoxy compositions is achieving viscosity stability at room temperature. Now referring to FIG. 1, some of the samples of Table 1 were evaluated for room temperature viscosity stability. The viscosity of SIEPX-C was very unstable at room temperature, the viscosity increasing more than 100% over a 30 day period. The viscosity of SIEPX-E was medium stable (60% increase over 30 days). The viscosity of SIEPX-F was stable at room temperature over a 30 day period (10% over 30 days).

One factor affecting the viscosity stability at room temperature was the type of epoxy functionalized nanoparticles used. With reference to Table 1, Nissan Chemical MEK-EC-2104 contains about 20% more epoxy functionality than Nissan Chemical MEK-EC-2102. When a more reactive epoxy functionalized 20 nm silica nanoparticle such as Nissan Chemical MEK-EC-2104 was used in the formulation (SIEPX-A through SIEPX-D2), the viscosity increased rapidly at room temperature regardless of the epoxy cross linker type, diluent type and their mixing ratios used in the formulation. When a less reactive epoxy functionalized 20 nm silica nanoparticle (such as Nissan Chemical MEK-EC-2102) was used in the formulation (from SIEPX-E to SIEPX-F), the viscosity at room temperature was more stable. It was surprisingly found that embodiments having a less reactive epoxy functionalized 20 nm silica nanoparticle (2102)

achieved compositions having stable viscosity at room temperature (i.e., from about 20° C. to about 24° C.)

Another factor affecting viscosity stability at room temperature was the hydroxyl functional group of the epoxy diluent containing oxetane. Specifically, the greater the number of hydroxyl functional groups in the formulation, the less stable is the composition. Comparison of SIEPX-E and SIEPX-F reveals less epoxy diluent in the form of 3-ethyl-3-hydroxymethyl oxetane resulted in more stable viscosity. It was surprisingly found that embodiments having 24.75% oxetane crosslinker and 24.75% epoxy diluent achieved compositions having stable viscosity at room temperature.

Adhesion Tests.

Specimens were prepared for dry and wet adhesion tests by hand coating ST2-size (60 mm×44 mm×0.7 mm thick)non ion-exchange glass with SIEPX-F compositions according to the formulations described below using 0.5, 1, 2 and 3 mil Bird applicator bars.

The coated specimens were UV cured using a Fusion UV curing system (Heraeus Noblelight Fusion UV of Gaithersburg, Md.) (20 j/cm2) and thermally cured in an oven (150° C. for 25 minutes). The specimen materials are listed in Tables 2 and 3. The non silane pre-treated glass (identified as SIEPX-F with 0% epoxy silane in Tables 2 and 3) was prepared as above. For the material including epoxy silane adhesion promoter as an additive in the SIEPX-F formulation (with 3.1% epoxy silane additive), 3.1 wt % silane (2-(3,4-epoxy cyclohexyl)-ethyl triethoxysilane) was mixed in SIEPX-F prior to sample preparation. For the material including epoxy silane adhesion promoter glass primer coating, 2 wt % silane (2-(3, 4-epoxy cyclohexyl)-ethyl triethoxysilane) in water/ethanol (5:95) solution was prepared first, the glass was dip coated with the silane solution and cured for 10 minutes at 100° C. This silane pre-treated glass was then coated with SIEPX-F as above.

TABLE 2

Dry adhesion test results by tape adhesion test and glass cutting method, microscope inspection

| Material | Curing profile | Delamination |
|---|---|---|
| SIEPX-F with 0% epoxy silane) | UV + 150 C., 25 minutes | Yes |
| SIEPX-F (with 3.1% epoxy silane) | UV + 150 C., 25 minutes | No |
| SIEPX-F (with 0% epoxy silane) + silane glass primer coating | UV + 150 C., 25 minutes | No |

TABLE 3

Wet adhesion in 80 C. hot water immersion for 6 hours, followed by microscope inspection for delamination

| Material | Curing profile | Delamination |
|---|---|---|
| SIEPX-F(with 0 % epoxy silane) | UV + 150 C., 25 minutes | Yes |
| SIEPX-F(with 3.1% epoxy silane) | UV + 150 C., 25 minutes | No |
| SIEPX-F (with 0 % epoxy silane) + silane glass primer coating | UV + 150 C., 25 minutes | No |

Tables 2 and 3 show the sample with the epoxy silane glass primer coating and the sample with the SIEPX-F formulation containing the epoxy silane adhesion promoter passed the adhesion tests, while the sample employing the SIEPX-F formulation without epoxy-silane adhesion promoter failed both adhesion tests. These results show the importance of using an epoxy silane adhesion promoter.

Surface Indentation Fracture Threshold Test.

A specimen was prepared by applying a coating of SIEPX-F onto a top surface of a nonion exchanged ST2 glass sheet having a thickness of 0.7 mm using a 0.5 mil Bird applicator bar. The coated glass was UV cured (28 j/cm2) and then thermally cured (150° C. for 25 minutes) to obtain a 25 µm thick coating.

The specimen was subjected to the surface indentation fracture threshold testing in accordance with D. J. Morris, S. B. Myers, R. F. Cook, "Indentation Crack Initiation in Ion-Exchanged Aluminosilicate Glass," Journal of Materials Science, 39, 2399-2410, (2004), incorporated herein by reference. The test method consists of pressing a Vickers diamond indenter (136° pyramid) into the surface (glass surface with coating or no coating) to a given load, then releasing the load. This is repeated at increasing loads until a load is reached where radial cracks initiate in glass from the indent impression. This load is treated as a threshold for the initiation of strength controlling flaws and is a measure of a glass's resistance to crack initiation. Indentation fracture threshold load is a measure of sharp contact damage resistance of glass.

Table 4 shows the SIEPX-F coating provided glass protection over 30 Kgf (indentation threshold fracture load) without glass fracture. By comparison the control glass (uncoated non-ion exchange glass) had a 0.3 Kgf indentation threshold fracture load. The result indicates the SIEPX-F coated glass provides very good sharp contact fracture resistance.

TABLE 4

Surface Indentation Fracture Threshold test results with SIEPX-F and non Ion Exchange Glass

| Surface Indentation fracture Test | Fracture force |
|---|---|
| SIEPX-F top coated non ion exchange glass at 25 µm | >30 Kgf |
| Non ion exchange glass | 0.3 Kgf |

Abraded 4 Point Bend Test.

Acid etched ST2 glass with ground edges was used for the abraded 4 point bend test. For the edge coating process, a 4 mil Bird applicator bar was first used to coat a SIEPX-F formulation (with 3.1% epoxy silane) onto a large glass substrate. Edges of non-silane pre-treated glass specimens and silane pre-treated glass specimens were dip coated onto the SIEPX-F coated glass substrate to pick up SIEPX-F on edge. The specimens were UV cured (28 J/cm2) and thermally cured (150° C., 25 minutes) to produce a final edge coating thickness of about 70 µm. For the material including epoxy silane adhesion promoter glass primer coating, 2 wt % silane (2-(3,4-epoxy cyclohexyl)-ethyl triethoxysilane) in water/ethanol (5:95) solution was prepared first, the glass was dip coated with the silane solution and cured for 10 minutes at 100° C. This silane pre-treated glass was then coated with SIEPX-F as above.

The specimens were subjected to the abraded 4 point bend test in accordance with ASTM C158 at 5 psi. Table 5 shows the specimens coated with SIEPX-F (with 3.1% epoxy silane adhesion promoter) and SIEPX-F (with 0% epoxy silane adhesion promoter and 2% epoxy silane adhesion promoter primer coating) scored a B10 strength of 662 MPa and 581 MPa, respectively, and scale parameter mean of 799 MPa and 782 MPa respectively, while the control non coated glass scored only MPa and 119 MPa respectively. The results indicate the SIEPX-F combined with silane adhesion promoter as an additive, or without silane adhesion promoter in the formulation but with glass pretreated with silane adhesion promoter, provides excellent glass edge protection.

TABLE 5

Abraded 4 point bend fracture test results SIEPX-F and Ion Exchange Glass

| Material & Curing Condition | B10 Strength (Mpa) | Scale Parameter (Mpa) |
|---|---|---|
| SIEPX-F (with 3.1% silane) + UV(28j/cm2) + 150° C., 25 minutes (no primer coating) | 662 | 799 |
| SIEPX-F (with 0% silane) + UV (28J/cm2) + 2% epoxy silane glass coating + 150° C., 25 minutes | 581 | 782 |
| Glass (2318, ion exchange) with no coating | 72 | 119 |

Tumbler Drop Test.

Acid etched ST2 glass with ground edges was used for a tumbler drop test. For edge coating, a 4 mil Bird applicator bar was used to coat SIEPX-F and ES28 formulations onto large glass substrates. ES28 is a 40% UV curable epoxy filled material from MasterBond in Hackensack, N.J. The first glass specimen was dip coated onto the coated glass substrate to pick up SIEPX-F with 3.1% silane adhesion promoter on an edge thereof. The second glass specimen was dip coated in a similar way to pick up ES28 on an edge. The glasses were cured UV (28 J/cm2) and thermal cure (150° C., 25 minutes) processing before being subjected to the tumbler drop test. The final edge coating thickness was about 70μ.

The tumbler drop test involved dropping each of the glass samples from a fixed height of 1 meter repeatedly on a drop surface made of steel until glass failure was observed. The number of such drops the glass survived (i.e., before failure) was recorded for each sample.

The testing apparatus consisted of a 1 meter length hollow tube of rectangular cross section made of Lucite, with end caps made of steel. The tube was mounted on a motor such that the tube was rotatable about a horizontal axis through the center of the tube perpendicular to the length. Testing commenced with a glass sample being placed at one end of the tube, after which the motor was started, commencing rotation of the tube. In operation, as one end of the tube approaches the highest vertical position, the sample free falls and lands on a steel plate at the opposite steel end cap. As the tube continues to rotate, the sample continues to fall from one end to the other end. Upon sample failure, the motor is stopped and the broken parts removed from the tube. After each failure the steel plates are cleaned and the tube vacuumed.

Figure 2:
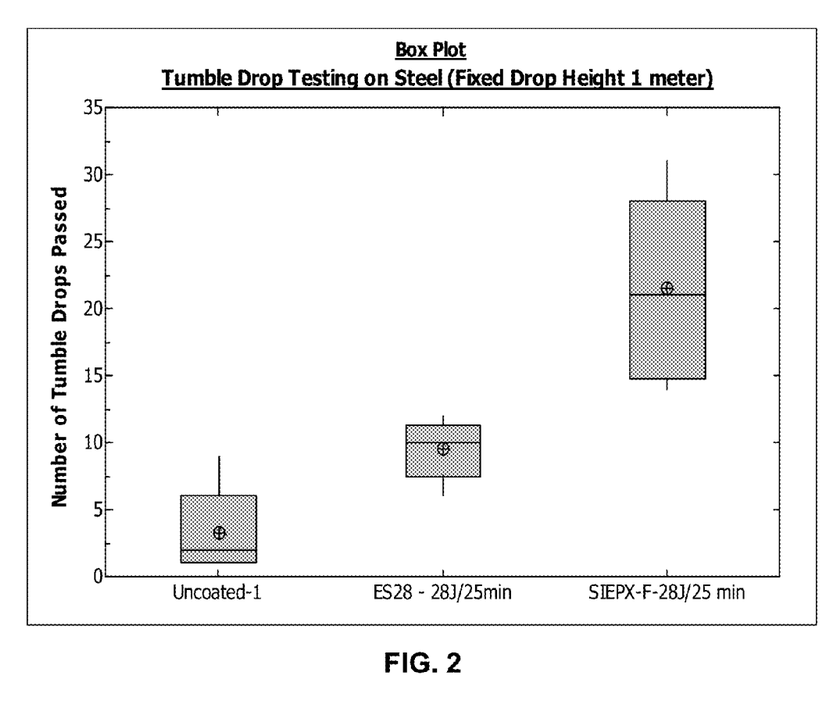
FIG. 2 is a graphical representation of tumble drop test results of samples in accordance with at least one embodiment of the disclosed subject matter.

Referring to FIG. 2, the average number of tumbler drops to failure of the control (uncoated glass) was 2. The average number of tumbler drops to failure of the ES28 edge coated glass was 6. The average number of tumbler drops to failure of the SIEPX-F edge coated glass was 20. These results indicate the SIEPX-F combined with silane additive provides excellent glass edge protection, superior to that provided by ES28.

Post-UV Cure Process.

In lieu of conventional heat oven curing, an IR tunnel can be used for a post-UV curing process to increase polymer crosslinking density.

For IR curing, after polymer edge coating and UV curing, the glass may be moved, such as by a belt, from the polymer coating tool to an IR tunnel such as an Economax infrared dryer available from M&R Companies, Glen Ellyn, Ill. Curing temperatures and times may vary. In one embodiment curing time depends on the temperature and speed of the glass moving through the tunnel. Curing temperatures may range from about 150-205° C.

Figure 3:
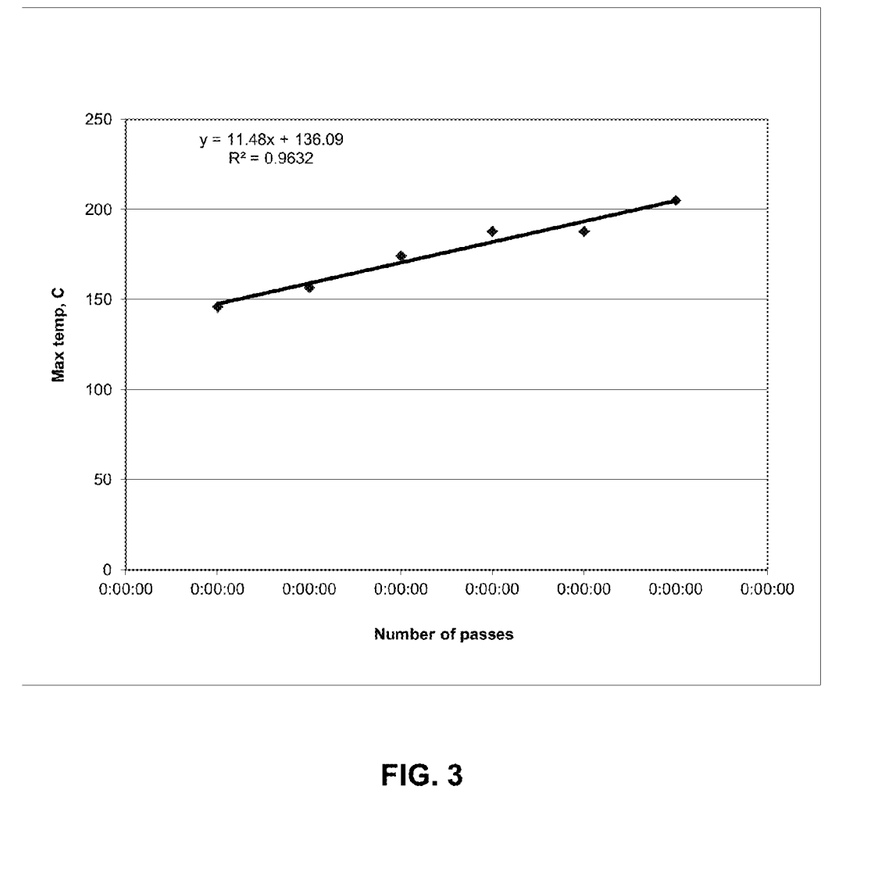
FIG. 3 is a graphical representation of a temperature profile of an IR tunnel with belt speed at 0.5"/s in accordance with at least one embodiment of the present disclosure.

IR curing provides several advantages. The glass sheet orientation is maintained, minimizing glass handling and providing a continuous process. By contrast, curing the coating in a furnace requires the glass sheets to be removed from the coating and placed in the furnace as part of a batch process. Additionally, IR curing can reduce the curing time while maintaining the coating performance. With reference to Table 6, for furnace (convection oven) curing, the optimal curing time is around 2 hours at 150° C. in order to pass the 80° C., 6 hour water immersion adhesion test. With IR curing, the curing time required for samples to pass the water immersion adhesion test is about 10 minutes using the curing profile in FIG. 3, (Economax set at 530 and belt speed 0.5 inches/sec). IR curing is also effective in producing samples that will pass an indentation fracture test (Table 7).

Adhesion and Indentation Fracture Tests:

Non-ion exchanged ST2 glass was used to prepare samples for the adhesion and indentation tests in Tables 11 and 12. A slot die coater was used to coat SIEPX-F onto glass specimens, followed by UV (20 j/cm2) and IR (10 minutes) to obtain 25 micron thick films for adhesion and indentation tests.

TABLE 6

SIEPX-F IR and Thermal cure 80° C. 6 hour hot water immersion adhesion test followed by microscope inspection for delamination

| Material dry adhesion | Curing profile | Delamination |
|---|---|---|
| SIEPX-F (with 3.1% epoxy silane) | UV + oven 150° C., 10 minutes | Yes |
| SIEPX-F (with 3.1% epoxy silane) | UV+ oven 150° C., 2 hrs | No |
| SIEPX-F (with 3.1% epoxy silane) | IR 10 minutes cure | No |

TABLE 7

Indentation fracture test results test with SIEPX-F and non-Ion Exchange Glass with IR and thermal cure.

| Surface Indentation fracture Test | Fracture force |
|---|---|
| SIEPX-F top coated non ion exchange glass at 25 μm, UV + oven 150° C. 2 hrs cure | >30 Kgf |
| SIEPX-F top coated non-ion exchange glass at 25 μm, UV + IR 10 minutes cure | >30 Kgf |
| Non ion exchange glass | 0.3 Kgf |

As shown in Table 7, the indentation threshold fracture load for the IR-cured sample is greater than 30 Kgf, comparable to the result for the sample oven cured at 150° C. for 2 hours, and much higher than the control, uncoated non-ion exchange glass (0.3 Kgf). This demonstrates short cycle time can be used to provide good mechanical protection properties when the material is cured using an IR tunnel as described.

Ion Exchange Glass

In applications where a glass should exhibit high strength, the strength of conventional glass may be enhanced by chemical strengthening (ion exchange). Ion exchange (IX) techniques can produce high levels of compressive stress in the treated glass, as high as about −400 to −1000 MPa at the surface, and is suitable for very thin glass. One such IX glass is Corning Gorilla® Glass available from Corning Incorporated.

Ion exchange is carried out by immersion of a glass sheet into a molten salt bath for a predetermined period of time, where ions within the glass sheet at or near the surface thereof are exchanged for larger metal ions, for example, from the salt bath. By way of example, the molten salt bath may include $KNO_3$, the temperature of the molten salt bath may within the range of about 400-500° C., and the predetermined time period may be within the range of about 2-24 hours, and more specifically between about 2-10 hours. The incorporation of the larger ions into the glass strengthens the sheet by creating a compressive stress in a near surface region. A corresponding tensile stress is induced within a central region of the glass sheet to balance the compressive stress. Sodium ions within the glass sheet may be replaced by potassium ions from the molten salt bath, though other alkali metal ions having a larger atomic radius, such as rubidium or cesium, may replace smaller alkali metal ions in the glass. According to particular embodiments, alkali metal ions in the glass sheet may be replaced by Ag+ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass sheet that results in a stress profile. The larger volume of the incoming ion produces a compressive stress (CS) on the surface and tension (central tension, or CT) in the center region of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of compressive layer. The depth of compressive layer will in some cases be greater than about 15 microns, and in some cases greater than 20 microns, to give the highest protection against surface damage.

Ion-exchangeable glasses that are suitable for use in the embodiments herein include borosilicate glasses. As used herein, "ion exchangeable" means that a glass is capable of exchanging cations located at or near the surface of the glass with cations of the same valence that are either larger or smaller in size.

Devices

General Structure and Considerations

Figure 4:
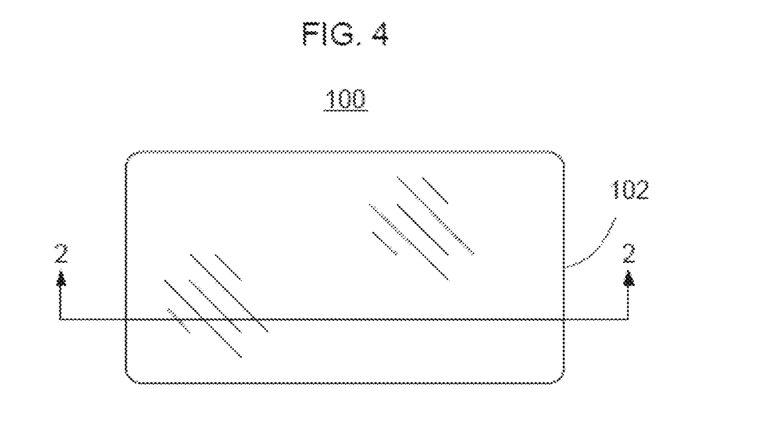
FIG. 4 is a schematic view of a glass substrate with a layer of material.

With reference to FIG. 4, a structure 100 may include a substrate 102 of interest in connection with the development of novel processes and structures to improve the scratch and impact resistance, edge strength and other properties of the substrate 102. For example, the substrate 102 material may be glass, specifically Gorilla® Glass from Corning Incorporated, which is an ion-exchange glass, usually an alkali aluminosilicate glass or alkali aluminoborosilicate glass. Those skilled in the art will appreciate that the specific substrate material is not limited to glass, or Gorilla® Glass in particular, however, such material was selected for experimentation and example.

As mentioned above, the addition of a UV-curable coating layer on the substrate 102 may provide enhanced scratch and impact resistance, edge strength and other properties to the structure 100.

In one embodiment, a process is disclosed for modifying the surface of a substrate, such as a glass substrate, the process including the steps of applying to the surface of the substrate a UV-curable coating including (in weight %) 5-50% cycloaliphatic crosslinker of the formula wherein R is wherein X is a $C_{1-4}$ straight chain, 20-55% of a summed amount of an oxetane crosslinker and an epoxy diluent, 35-45% epoxy functionalized silicon nanoparticles, 0-5% epoxy silane adhesion promoter and 0.5-2% photoinitiator, and curing the surface using ultraviolet radiation. The curing step may include thermal curing. The process may include applying an epoxy silane adhesion promoter to the surface of the substrate when the UV-curable coating contains 0% epoxy silane adhesion promoter.

Figure 5:
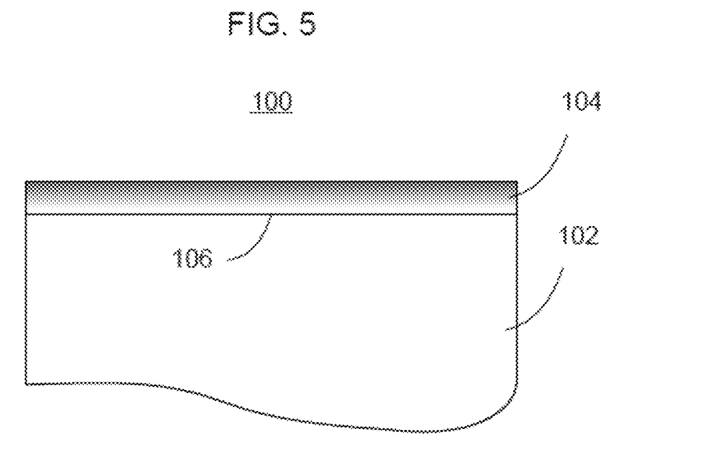
FIG. 5 is a schematic, side view of the glass substrate of FIG. 4 taken through cross-sectional line 2-2.

With reference to FIG. 5, one or more embodiments herein provide for a structure 100 having a substrate 102 and a scratch and impact resistance layer 104 disposed on the substrate 102. In a broad aspect, the structure 100 includes the substrate 102 having first surface (not shown) and second, opposing surface 106, and at least one layer formed of a UV-curable coating 104 as described herein substantially covering the substrate 102. It is noted that the phrase "substantially covering" herein means that the superior layer (i.e., the layer 104) overlies the inferior layer (i.e., the substrate 102) either directly or indirectly through one or more intermediate layers. In one or more embodiments, the layer 104 may be disposed on either or both sides of the substrate 102. In the embodiment illustrated in FIG. 5, there are no intermediate layers shown between, for example, the layer 104 and the substrate 102, although such intermediate layers are contemplated.

The coating layer 104 may be formed as a single layer of material. Those skilled in the art will appreciate from the disclosure herein that the details presented will readily enable a skilled artisan to employ one or more methodologies for applying layer 104 by applying well-known layering techniques.

Substrate Material and Characteristics

In the illustrated examples, the substrate 102 is substantially planar, although other embodiments may employ a curved or otherwise shaped or sculpted substrate 102. Additionally or alternatively, the thickness of the substrate 102 may vary, for aesthetic and/or functional reasons, such as employing a higher thickness at edges of the substrate 102 as compared with more central regions.

The substrate 102 may be formed of any suitable material, such as from at least one of quartz, glass, glass-ceramic, oxide glass, ion exchanged glass, polymer, combinations thereof, or other material(s).

When the substrate 102 is formed of glass or glass ceramic materials, then any suitable glass composition may be employed, such as soda lime glass ($SiO_2$, $Na_2O$, CaO, etc.), metallic alloy glasses, ionic melt glass, polymer glasses (acrylic glass, polycarbonate, polyethylene terephthalate), etc.

Process Considerations

Skilled artisans will appreciate that the mechanical properties of a layer (such as the layer 104) are closely related to the material composition, processing condition and material structures. Therefore, various techniques and methods are available to the artisan to achieve desired elastic (and/or hardness) gradient characteristics. Among the techniques available to the artisan is to control the deposition processing conditions, such as temperature, cooling profile, etc., to adjust residual stress and materials structure to reach a particular modulus (or hardness) gradient.

Those skilled in the art will appreciate, however, that the particular mechanism by which the layers 104 are applied is not strictly limited to the aforementioned techniques, but rather may be selected by the artisan in order to address the exigencies of a particular product application or manufacturing goal.

Thickness of the Layer

In most cases, the layer 104 is relatively thin, e.g., the layer 104 will generally have a thickness within some range. For example, contemplated thickness ranges include at least one of: (i) between about 10-200 nm; (ii) between about 20-100 nm; and (iii) between about 30-90 nm. Such ranges may be suited for a particular functional property, for example, the application of a layer 104 for thin film transistor applications, sensor applications, and display device applications such as monitor and telecommunication device applications. Still further contemplated thickness ranges include at least one of: (i) between about 50-10,000 nm; (ii) between about 500-10,000 nm; and (iii) between about 1000-2000 nm.

Although the disclosure herein has been described with reference to particular embodiments, it is to be understood that these embodiments are merely illustrative of the principles and applications of the embodiments herein. It is therefore to be understood that numerous modifications may be made to the illustrative embodiments and that other arrangements may be devised without departing from the spirit and scope of the present application.

What is claimed is:

1. An ultraviolet (UV)-curable coating composition comprising (in weight %) 5-50% cycloaliphatic crosslinker of the formula wherein R is wherein X is a $C_{1-4}$ straight chain,
20-55% of a summed amount of an oxetane crosslinker and an epoxy diluent, 35-45% epoxy functionalized silicon nanoparticles, 1-5% silane adhesion promoter and 0.5-2% photoinitiator.

2. The UV-curable coating composition of claim 1 comprising 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator.

3. The UV-curable coating composition of claim 1 consisting of 5.5-27.5% cycloaliphatic crosslinker, 27.5-49.5% of a summed amount of oxetane crosslinker and epoxy diluent, 39.9% epoxy functionalized silicon nanoparticles, 3.1% epoxy silane adhesion promoter and 2% photoinitiator.

4. The UV-curable coating composition of claim 1 comprising 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

5. The UV-curable coating composition of claim 1 consisting of 5.5% cycloaliphatic crosslinker, 24.75% oxetane crosslinker, 24.75% epoxy diluent, 39.9% epoxy functionalized silicon nanoparticles, 3.1% epoxy silane adhesion promoter and 2% photoinitiator.

6. The UV-curable coating composition of claim 1 wherein the oxetane crosslinker is bis(1-ethyl-(3-oxetanyl)methyl) ether.

7. The UV-curable coating composition of claim 1 wherein the epoxy diluent is 3-ethyl-3-hydroxymethyl oxetane.

8. The UV-curable coating composition of claim 1 wherein the silicon nanoparticles of the epoxy functionalized silicon nanoparticles are in the range of 5-200 nm.

9. The UV-curable coating composition of claim 1 wherein the silane adhesion promoter is selected from an amino functional silane, a ureido functional silane, an epoxy functional silane, a sulfur functional silane, and mixtures thereof.

10. The UV-curable coating composition of claim 1 wherein the silane adhesion promoter is an amino functional silane selected from the group consisting of 3-aminopropyltriethoxysilane, 3-aminopropyltrimethoxysilane, aminophenyltrimethoxysilane, 3-aminopropyltris(methoxyethoxyethoxy)silane, 3-(m-aminophenoxy)propyltrimethoxysilane, 3-aminopropylmethyldiethoxysilane, N-(2-aminoethyl)-3- aminopropyltrimethoxysilane N-[3-(trimethoxysilyl)propyl] ethlenediamine damosilane, N-(2-aminoethyl)-3-aminopropyltriethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-3-[(amino(polypropyleneoxy)]aminopropyltrimethoxysilane, (3-trimethoxysilylpropyl)diethylene triamine, (3-trimethoxysilylpropyl)diethylenetriaminesilane, N-phenylaminopropyltrimethoxysilane, N-phenylaminomethyltriethoxysilane, bis(trimethoxysilylpropyl)aminesilane, bis[(3-trimethoxysilyl)propyl]-ethylenediaminesilane, bis[3(triethoxysilyl)propyl]ureasilane and mixtures thereof.

11. The UV-curable coating composition of claim 1 wherein the silane adhesion promoter is a ureido functional silane selected from the group consisting of ureidopropyltriethoxysilane, ureidopropyltrimethoxysilane and mixtures thereof.

12. The UV-curable coating composition of claim 1 wherein the silane adhesion promoter is an epoxy functional silane selected from the group consisting of 2-(3,4-epoxycyclohexyl)ethyltriethoxysilane, 2-(3,4-epoxycyclohexyl)ethyl-trimethoxysilane, (3-glycidoxypropyl)trimethoxysilane 3-(2,3-epoxypropoxy)propyltrimethoxysilane, (3-glycidoxypropyl)triethoxysilane, 5,6-epoxyhexyltriethoxysilane and mixtures thereof.

13. The UV-curable coating composition of claim 1 wherein the silane adhesion promoter is a sulfur functional silane selected from the group 3-mercaptopropyltrimethoxysilane, 3-mercaptopropyltriethoxysilane, bis-N—N'-(triethoxysilylpropyl)aminocarbonylpolyethylene oxide, bis-(3-(triethoxysilylpropoxy)-2-hydroxypropoxy)-polyethylene oxide, N—N'-(bis(2-hydroxyethyl)-N,N'bis(3-trimethoxysilylpropyl)ethylene-diamine, and mixtures thereof.

14. The UV-curable coating composition of claim 1 wherein the silane adhesion promoter is 2-(3,4-epoxycyclohexyl)ethyltriethoxysilane, 2-(3,4-epoxycyclohexyl)ethyltrimethoxysilane or a mixture thereof.

15. The UV-curable coating composition of claim 1 wherein the photoinitiator is triarylsulfonium hexafluoroantimonate.

16. The UV-curable coating composition of claim 1 wherein the viscosity of the composition is stable in the range of −20° C. to 40° C.

17. A process for modifying the surface of a substrate comprising applying to the surface a UV-curable coating comprising (in weight %) 5-50% cycloaliphatic crosslinker of the formula wherein R is wherein X is a $C_{1-4}$ straight chain,
20-55% of a summed amount of an oxetane crosslinker and an epoxy diluent, 35-45% epoxy functionalized silicon nanoparticles, 0-5% silane adhesion promoter and 0.5-2% photoinitiator, and curing the surface using ultraviolet radiation.

18. The process of claim 17, further comprising thermally curing the surface.

19. The process of claim 17 wherein the UV-curable coating is operable to provide a modified surface having an indentation threshold fracture load of at least 30 Kgf.

20. The process of claim 17 comprising applying the UV-curable coating to a non-strengthened glass surface.

21. The process of claim 17 wherein the substrate comprises a non-strengthened glass surface and a strengthened glass surface, and the process comprises applying the UV-curable coating to at least the non-strengthened glass surface to increase the indentation threshold fracture load of the non-strengthened glass surface to at least 30 Kgf.

22. The process of claim 17, wherein the substrate comprises glass.

23. The process of claim 17, further comprising applying silane adhesion promoter to the surface of the substrate.

24. An article comprising a substrate and a coating on a surface of the substrate wherein the coating comprises (in weight %) 5-50% cycloaliphatic crosslinker of the formula wherein R is wherein X is a $C_{1-4}$ straight chain,
20-55% of a summed amount of an oxetane crosslinker and an epoxy diluent, 35-45% epoxy functionalized silicon nanoparticles, 1-5% silane adhesion promoter and 0.5-2% photoinitiator.

25. The article according to claim 24 wherein the surface comprising the coating comprises an indentation threshold fracture load of at least 30 Kgf.

26. The article according to claim 24 wherein the substrate comprises glass.

27. The article according to claim 24 wherein the substrate comprises a non-strengthened glass surface and a strengthened glass surface and the UV-curable coating is disposed on at least the non-strengthened glass surface.

* * * * *